United States Patent Office 2,928,260
Patented Mar. 15, 1960

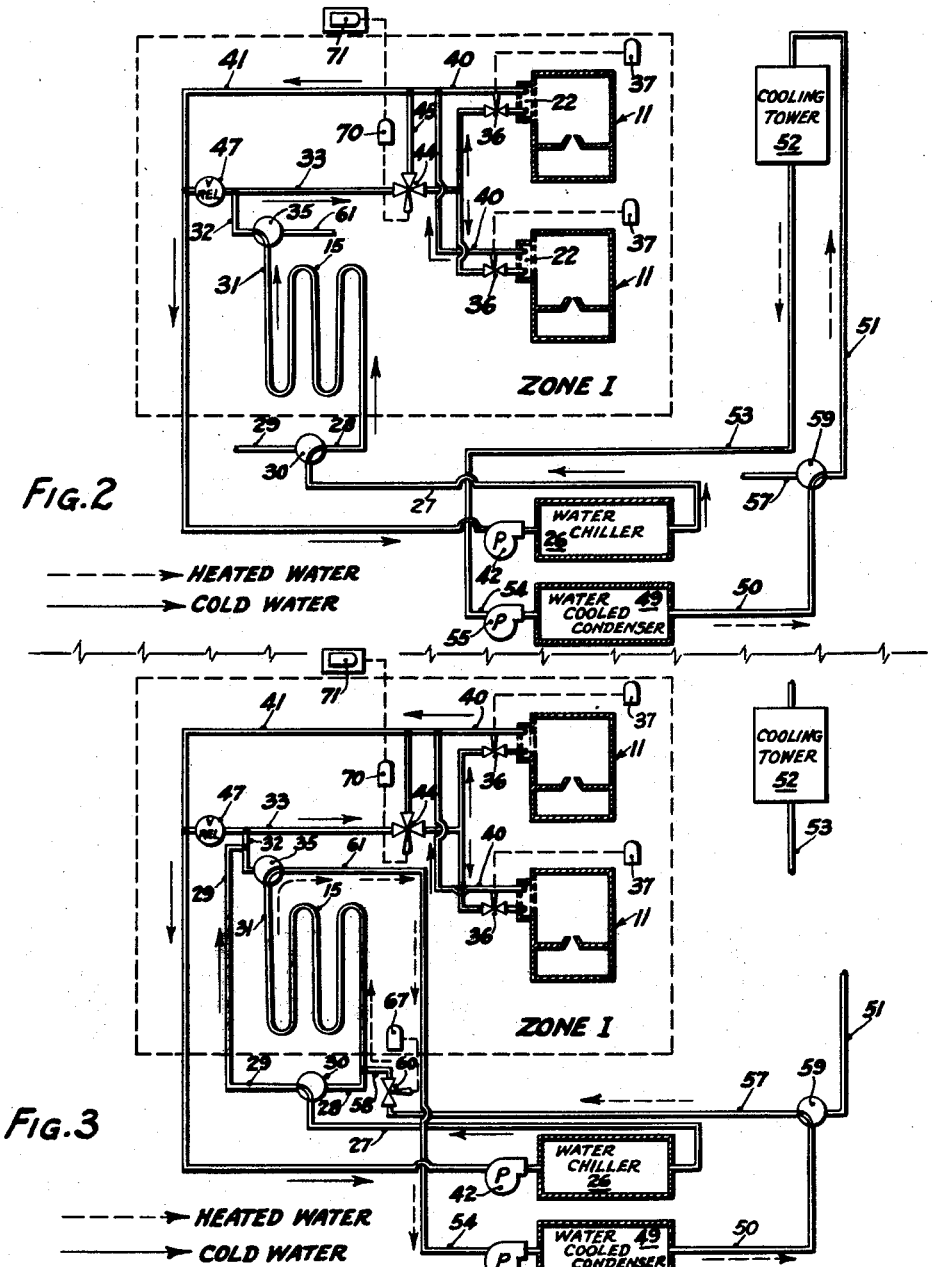

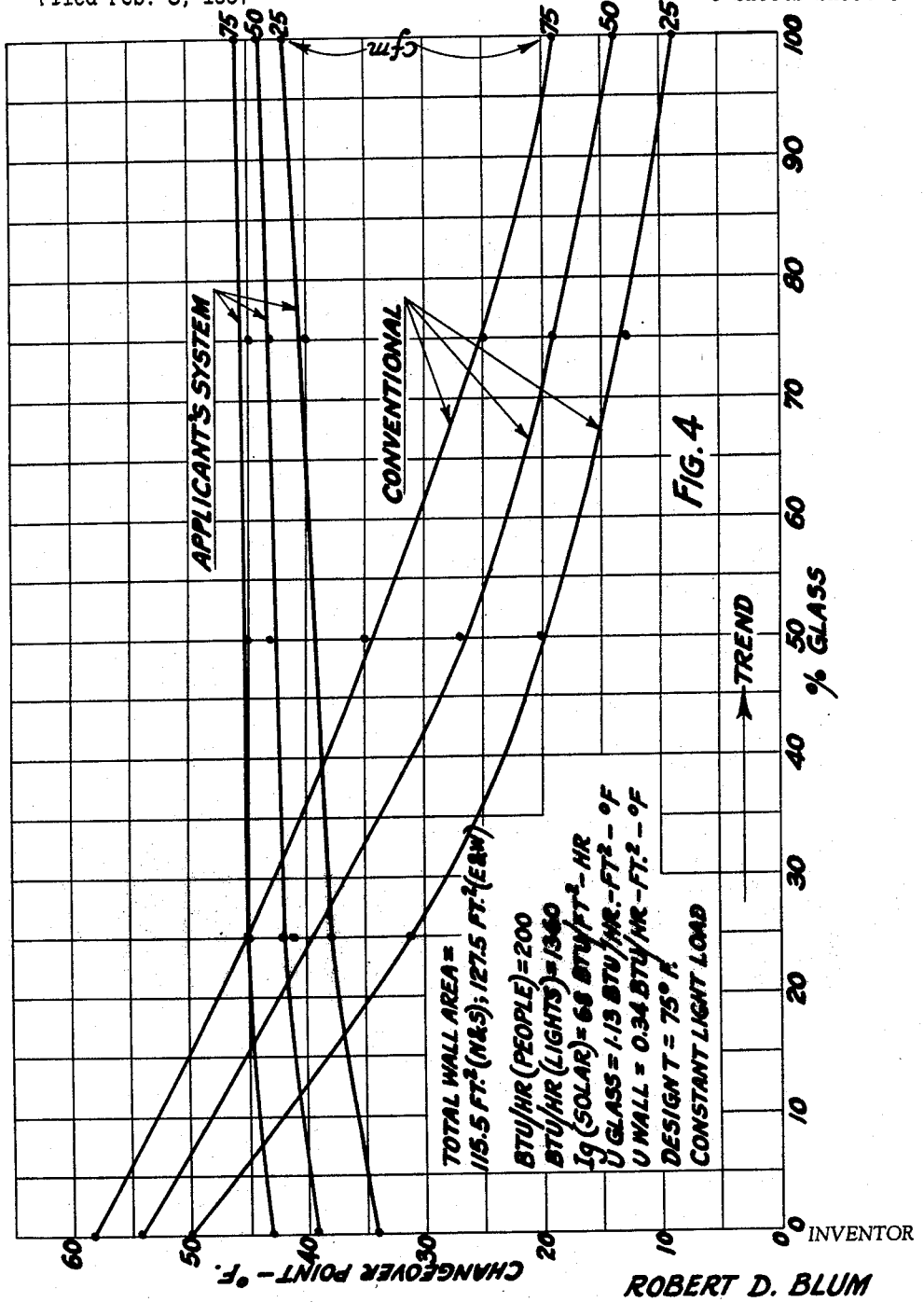

2,928,260

AIR CONDITIONING SYSTEMS

Robert D. Blum, York, Pa., assignor to Borg-Warner Corporation, Chicago, Ill., a corporation of Illinois Application February 8, 1957, Serial No. 638,962

6 Claims. (Cl. 62—325)

This invention relates to air conditioning systems for year-round conditioning of multi-room buildings.

In a typical air conditioning system, and specifically a typical induction system, induction units are provided in or near the various rooms to be air conditioned. Each unit comprises primarily a heat-exchange coil and a nozzle means. Outside or primary air is treated in a conditioner and is led to a plenum chamber in the unit. The primary air discharges through the nozzle means at a velocity sufficiently high to induce a flow of room air through the unit. The heat-exchange coil is placed in the path of flow of the room air and thereby effects local conditioning of the room air. The two air streams (primary and room) then merge and are discharged into the room. A heated or chilled heat-exchange fluid, such as water, is circulated through the heat-exchange coil dependent on whether it is desired to add heat to or remove heat from the room air.

The induction system is characterized by three cycles of operation: summer, intermediate and winter.

On the summer cycle, which is that time of the year when the outside temperature is above the temperature it is desired to maintain in the conditioned space, otherwise known as the design temperature, water is chilled by a central refrigerating system and this chilled water is then circulated through the unit heat-exchange coils. During the summer cycle the coils are designed to take care of the internal sensible heat gain imposed by people, lights, solar effect, etc. The primary air, in addition to providing for ventilation requirements, is conditioned to take care of the sensible heat transmission gain through the wall and glass areas of the conditioned space. The primary air, therefore, will be cooled and dehumidified and supplied to the induction units at a temperature below the design temperature.

When the outside temperature goes below the design temperature, the system shifts into intermediate cycle operation. As in the summer cycle, the coils are designed to take care of the internal sensible heat gain imposed by people, lights, solar effect, etc. and will, therefore, have chilled water circulated therethrough. The primary air is again conditioned to take care of the sensible heat transmission through the wall and glass areas of the conditioned space. With the outside temperature below the design temperature, there will be a sensible heat transmission loss through the wall and glass areas of the conditioned space. The primary air will therefore be dehumidified and slightly heated to compensate for this sensible heat transmission loss. As the outside air temperature drops, the temperature of the primary air is further raised to compensate for the greater sensible heat transmission losses.

It will be apparent, therefore, that on both the summer and intermediate cycles, the unit coils are designed to compensate for the internal sensible heat gain, while the primary air is dehumidified and cooled or heated dependent on whether there is a sensible heat transmission gain or loss.

As the outside temperature continues to drop, the "changeover" temperature (generally called "changeover" point and presently as low as approximately 25° F.) is reached, and the system shifts into the winter cycle of operation wherein the refrigerating system is shut off. Heated water is then piped to the various room coils to take care of the sensible heat transmission loss. Primary air is allowed to pass through the conditioner at a minimum temperature of about 40° F. to prevent any possible freezing of primary air water coils therein and therefore reaches the rooms at a minimum temperature of about 48° F. (considering all system losses). The primary air must be able to take care of any internal sensible heat gain. The heated water in the room coils must also be able to provide for the primary air sensible heating load, which is the heat required to bring the temperature of the primary air up to design temperature from its entering temperature of about 48° F. The actual amount of heat required will vary according to the internal sensible heat gain, with the total heat required being the primary air sensible heating load less the heat given off by people, lights, solar effect, etc. It can be readily understood, however, that the heated water must be able to provide for the worst condition, which is when there is no internal sensible heat gain.

It can thus be seen that a conventional system utilizes chilled water in the coils and dehumidified (hot or cold) primary air for the summer and intermediate cycles and heated water in the coils and cold primary air for the winter cycle.

The "changeover" point is determined as follows:

In any one zone or conditioned space within that zone there will be a maximum internal sensible heat gain. There will also be a sensible heat transmission loss. The maximum internal sensible heat gain minus the sensible heat transmission loss equals the net internal sensible heat gain which may be termed the net internal sensible cooling load. When this net internal sensible cooling load is no greater than the sensible effect of cooling that can be delivered by the incoming primary air at its minimum temperature of about 48° F., the "changeover" point (in effect the temperature at which the refrigerating system, including the usual cooling tower, may be shut down) has been reached. Since the generally large buildings utilizing induction systems are usually divided into a plurality of zones, for reasons to be hereinafter explained, the "changeover" point is dictated by that zone or conditioned space within that zone having the largest net internal sensible cooling load. Since there is but one refrigerating system for the entire building, it must be kept in operation to deliver chilled water to any zone wherein the net internal sensible cooling load is greater than can be taken care of by incoming cold primary air.

The system as it is now used has a great degree of flexibility because of the fact that on the intermediate cycle, when the outside temperature is below the design point, there is chilled water available at the room coil and dehumidified and heated air supplied to the room, which allows the system to either heat (no chilled water flow through coil) or cool (flow of chilled water through the coil). On the winter cycle there is the combination of heated water available in the coils and cold primary air supplied to the room allowing the system to cool (no heated water flow through coil) or heat (heated water allowed to flow through the coil).

The disadvantages of the system are that since the room coil has a chilled water supply during the summer and intermediate cycles of operation and a heated water supply during winter cycle, where automatic controls must be used, they become very complex. Opening the valves controlling water flow through the coils during the summer or intermediate cycles would provide cooling, while opening the valves in the winter cycle would provide heating. Therefore, some means must be provided for reversing the controls from winter to summer and intermediate operation, and back. Further, even when hand valves are used, some means must be provided for indicating whether heated or chilled water is available at the coils so that one would open the valves in the summer or intermediate cycles for a cooling effect, while closing the valves in the winter for the same, since cold air is then flowing through the unit. One could not relay on sensory perception to indicate whether cold or hot air was flowing from the unit since even heated air at a relatively low humidity and high velocity could give a sensation of cooling. Thus, some device need be provided which would indicate positively whether the valve should be opened or closed to give the desired heating or cooling. Patent No. 2,363,294, for example, illustrates the type of complex controls that must be provided for either automatic or manual controls in a conventional induction system.

In addition to the above disadvantages, the increased trend toward buildings having larger and larger glass areas has a marked effect on lowering the "changeover" point in conventional systems, as will be more fully pointed out hereinafter. Since cooling towers are generally operated to dissipate the condenser heat of the refrigerating system, "changeover" points below 32° F., which are now common, necessitates operating the tower in below freezing weather with all the consequent operational difficulties. In this respect a "changeover" point above 32° F. would be desirable. Still further, as induction units have become more efficient, that is, as the ratio of primary air to induced air has lowered (the ideal would be only enough primary air to provide for ventilation and yet still provide a sufficient induction effect on the room air to effect the necessary local conditioning in the unit), the "changeover" point has become lower and lower. It can readily be seen that with the lesser quantity of primary air at a fairly constant minimum temperature of about 48° F., less capacity of sensible cooling can be delivered. In the net internal sensible cooling load calculations for a particular building the maximum internal sensible cooling load consisting of people, lights, solar effect, etc., is fairly constant. Therefore, the only way of decreasing the net internal sensible cooling load is to "changeover" at a point when the sensible heat transmission loss has increased. This dictates "changeover" at lower temperatures as the efficiency of the induction unit increases. The problems encountered here are in respect to the above mentioned difficulties of cooling tower operation in below freezing weather.

I propose an induction system that retains the flexibility of the system as it is now known but does away with the expense and difficulty of winter-summer unit controls and lower "changeover" points due to the trend to more glass areas. A less adverse effect will be occasioned by the increasing efficiency of induction units. Further, the system is characterized by the use of the refrigeration apparatus the year round.

In my system, chilled water is fed year-round to the unit heat-exchange coils to take care of the internal sensible heat gain. The primary air is always conditioned to counter-act the sensible heat transmission gain or loss. The winter cycle is distinguished from the summer and intermediate cycles in that, on the winter cycle, the condenser heat of the refrigerating system, instead of being dissipated in a cooling tower, is utilized to heat up the incoming primary air. Since chilled water is fed year-round to the unit heat-exchange coils there is no necessity for the cumbersome, expensive and complex summer-winter controls of the conventional system as hereinabove set out and simple air conditioning controls may be used.

Further, as will be pointed out below, the "changeover" point in my system will not be so severely affected by the increasing unit efficiencies. The trend to larger glass areas in buildings generally has a beneficial effect, in my system, on the "changeover" point which remains fairly constant and at an elevated temperature. The desirability of a high "changeover" point is based on two factors: (1) the aforementioned cooling tower operation which is difficult and costly in below freezing temperatures and (2) the fact that in my system, when on the winter cycle, condenser heat is efficiently utilized to heat incoming primary air rather than being dissipated to the atmosphere.

The "changeover" point in my system (the temperature at which condenser heat is put into incoming primary air and the cooling tower shut down) is reached when the highest total internal sensible heat gain occurring within the building during any period of the day, as reflected in the heated condenser water, is just sufficient to provide for the sensible heat transmission losses of the building. Severely and technically defined it is that temperature at which the block internal sensible heat gain, which is the highest instantaneous internal sensible heat gain for the entire building, considering the solar effect on but one exposure), and including the heat of compression of the refrigerating compressor, is equal to the heating demanded by the building, that is, the sensible heat transmission loss plus the heat required to bring the primary air up to design temperature. Since, as pointed out above, after the "changeover" point is reached in my system the condenser heat is utilized to heat the incoming primary air stream, the system cannot be changed over until such a time as the primary air stream can utilize all of the condenser heat available to counteract the sensible heat transmission loss.

It is, therefore, an object of this invention to provide an improved air conditioning system of the type wherein a chilled fluid is utilized to compensate for internal sensible heat gains within a space to be conditioned and outside or primary air is conditioned to compensate for sensible heat transmission and wherein heat picked up by the chilled fluid is utilized to heat the primary air when there are sensible heat transmission losses.

It is a further object of the invention to provide an improved air conditioning system including a plurality of heat-exchange coils, each located in air communication with a room to be conditioned and also including a plurality of air delivery means. The heat-exchange coils are provided with a chilled fluid to compensate for internal sensible heat gains and primary air is delivered to the air delivery means for discharge into the rooms, the primary air being treated to counteract sensible heat transmission. It is a further object of the invention to provide an air conditioning system of the type above-mentioned wherein heat picked up by the chilled fluid is rejected into the primary air for heating the same during winter operation.

It is a still further object of the invention to provide an air conditioning system including a plurality of conditioning units, each of said units being located in air communication with a room to be conditioned and said units each including a heat-exchange coil and a nozzle. Primary air is discharged through the nozzles for inducing a flow of room air into the units and through the heat-exchange coils. A refrigerating system supplies a chilled fluid and a heated fluid, the chilled fluid being utilized in the unit heat-exchange coils and for treating the primary air and the heated fluid being alternately used for treating the primary instead of the chilled fluid.

Another object of the invention is to provide an improved air conditioning system of the type first mentioned including a plurality of induction units located in air communication with rooms to be conditioned, with each unit having a heat-exchange coil and a nozzle. A source of primary outside air including an air dehumidifying coil is also provided. Means are provided for connecting the primary air to the nozzles for inducing a flow of room air over the heat-exchange coils. Any suitable refrigerating apparatus is utilized for supplying a chilled and heated fluid with connections being provided for alternately connecting the chilled fluid with the dehumidifying coil or for connecting the heated fluid with the dehumidifying coil. It is also an object to connect the chilled fluid with the heat-exchange coils in the induction units to provide for any internal sensible heat gain in the rooms to be conditioned. It is more particularly an object to provide cooling mechanism external of the building to be conditioned, such as a cooling tower, to which is supplied the heated fluid during summer operation and which is bypassed so that the heated fluid flows through the dehumidifying coil for winter operation.

The invention consists of the novel constructions, arrangement and devices to be hereinafter described and claimed for carrying out the above stated objects and such other objects as will appear from the following description of a preferred embodiment of the invention described in reference to the accompanying drawings, in which:

Fig. 2 shows schematically the chilled water and heated condenser water flow on the summer and intermediate cycles;

Fig. 3 shows schematically the chilled water and heated condenser water flow on the winter cycle; and Fig. 4 is a graph showing the effect of increasing glass areas on the "changeover" point of a conventional system and on my system for varying c.f.m.'s of primary air delivered to the induction units.

Like numerals refer to like parts throughout the several views.

Figure 1:
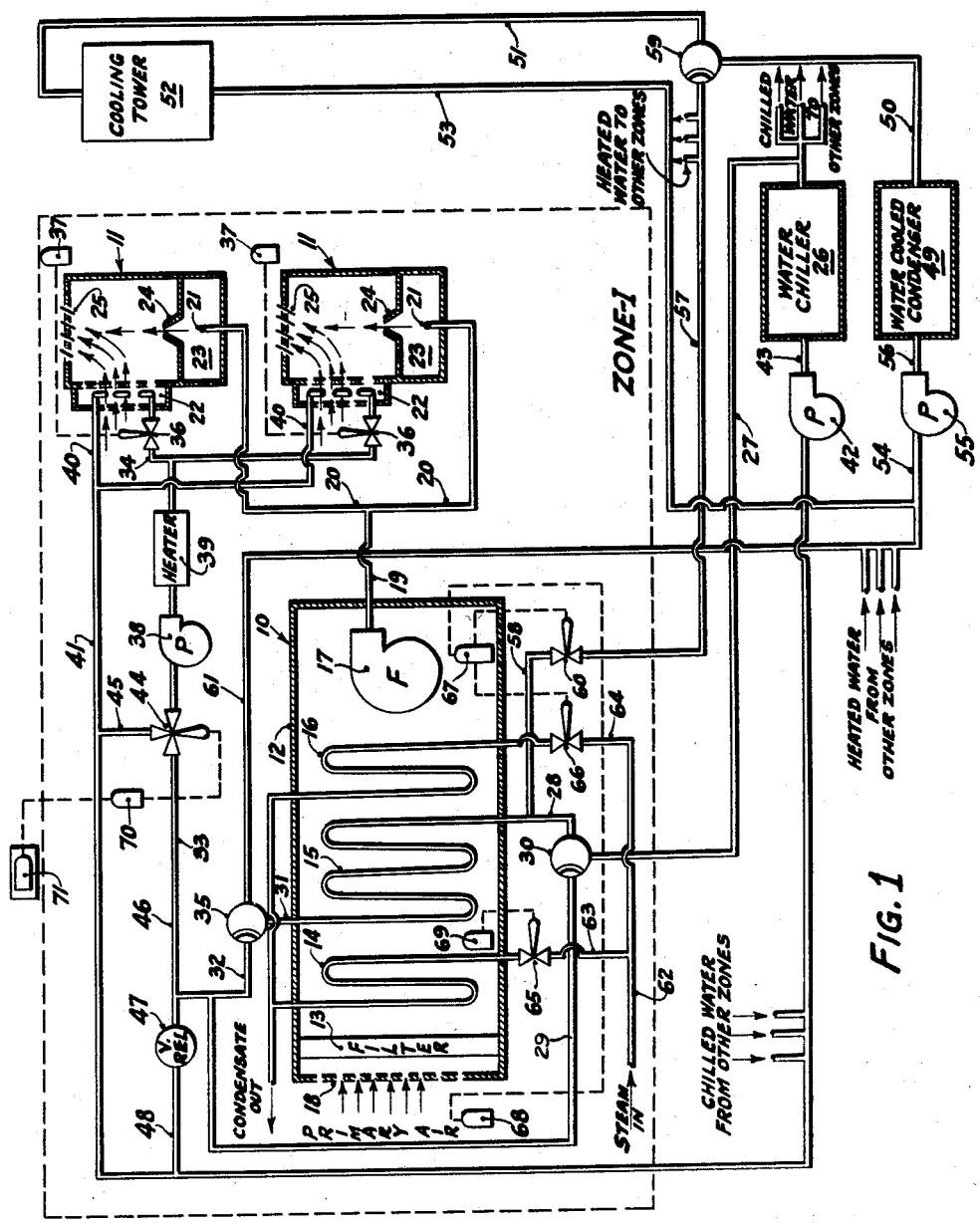
Fig. 1 is a diagrammatic representation of an air conditioning system according to the invention.

In conditioning a building according to the invention, the building is divided generally into four zones—north, east, south and west to take due account of the solar effect on any exposure. Since the primary air is conditioned to take care of the sensible heat transmission loss or gain, the units for various rooms making up a zone must be selected on some basis allowing for approximately the same primary air temperature. Each zone is provided with a conditioner 10 and a plurality of conditioning units 11, with a unit being in air communication with each space to be conditioned.

Zone conditioner 10 comprises a casing 12 in which is located a filter 13, a preheater 14, a dehumidifying coil 15, a reheater 16, and a fan 17 of any convenient type. Fan 17 will be generally of a constant speed type and of sufficient capacity to deliver to all units primary air at the required static pressure to provide for the necessary air velocity at the nozzles to produce the desired induction effect when the air discharges within the units. Air inlet openings 18 are provided in the casing 12 and a discharge conduit 19 serves to connect the fan to several conduits 20 which terminate in discharge openings 21 in the various units.

Only two units have been shown, but it will be appreciated that as many units will be provided as is necessary to serve the zone, with one or more units being in air communication with each room to be conditioned. Each unit contains a chilled water coil 22, a plenum chamber 23, an air discharge nozzle 24, and an air outlet 25 from which the air is discharged into the room to be conditioned.

Central refrigerating means are provided for supplying chilled water to all the zones at any desired temperature. Any type of refrigerating system with the usual thermostatic controls for maintaining the desired chilled water temperature will be provided and includes a water chiller 26 in which the water may be chilled by any suitable refrigerating medium. An outlet line 27 connects the water chiller with the dehumidifying coil 15 via line 28. A bypass line 29 is also provided for bypassing chilled water around the dehumidifying coil during winter operation. Three-way valve 30 interconnects lines 27, 28 and 29 and allows flow of chilled water from line 27 to either of lines 28 or 29. From the dehumidifying coil, lines 31, 32 and 33 are provided connecting the outlet of the dehumidifying coil to the inlet of the several lines 34 which lead to the coils 22 in the various units. Water flow between lines 31 and 32 is controlled by a three-way valve 35. Suitable valves 36, controlled by simple air-conditioning thermostats 37 located in the conditioned spaces, are provided in the various lines 34 for controlling the flow of cold water through the heat-exchange coils 22. Conventionally, on a rise in temperature of the conditoned space, thermostats 37 will open valves 36 to allow for the necessary chilled water flow through coils 22 to provide the desired cooling.

A pump 38 located in line 33 serves to force the chilled water through the various coils 22 to the units. A heater 39 of any suitable type is also provided in line 33 for standby heating when the primary air fan 17 is shut down, as for example, on week ends. Heater 39 will generally have a safety control (not shown) so that it cannot operate when fan 17 is in operation and will be controlled generally by a simple heating thermostat (not shown). Outlet lines 40 lead from the room coils and connect via line 41 to the inlet side of a pump 42 and thence through line 43 to the water chiller 26.

A distributing valve 44 is connected into line 33 and a line 45 interconnects line 41 and the distributing valve 44 for the purposes to be later explained. One outlet of distributing valve 44 is connected by a line 46 to a pressure relief valve 47 and thence by way of line 48 into line 41.

A water cooled condenser 49 is also provided as part of the refrigerating system and serves to pick up heat rejected by the refrigerating system. The condenser water circuit as shown in Fig. 1, comprises lines 50 and 51 which lead to a cooling tower 52, which may be of any conventional type. From the cooling tower 52, lines 53 and 54 lead to the inlet of a pump 55. A line 56 connects the outlet of the pump to the condenser. This completes the circuit for the heated condenser water when the system is on the summer on intermediate cycle.

However, when the system is switched over to the winter cycle the heated condenser water is then bypassed around the cooling tower. The condenser is then connected to the dehumidifying coil 15, to supply condenser water thereto via lines 57 and 58. A three-way valve 59 interconnects lines 50, 51 and 57 and allows the condenser water to flow from line 50 to line 51 or 57. Lines 57 and 58 are connected by a valve 60. A connection 61 taken from valve 35 serves to lead the condenser water from coil 15 back to the inlet of pump 55. It will be thus apparent that heat picked up by the chilled water in the unit coils 22 will be rejected by the refrigerating system into the condenser water which will become heated thereby. This heat is then rejected into the incoming primary air by the heated condenser water flowing through coil 15. The net result is that heat picked up by the chilled fluid in coils 22 is ultimately rejected into the incoming primary air to heat the same on the winter cycle.

A steam line 62 serves to conduct steam derived from any suitable source to lines 63 and 64 leading into the reheater and preheater respectively. Valves 65 and 66 control flow of steam through lines 63 and 64. A master-submaster thermostatic arrangement 67—68, preferably of the type provided by the Minneapolis-Honeywell Regulator Company, is provided for controlling the temperature of the air off the reheater 16 according to outside conditions. A two-step thermostat 67 is placed in the leaving air stream and controls valves 60 and 66. Thermostat 67 will open valve 60 to allow heated condenser water to pass through coil 15 (winter operation) when heating of the primary air is called for. As valve 60 opens fully to allow full flow of condenser water through the coil 15, should more heat be required than can be supplied by the full flow of condenser water, then thermostat 67 will gradually open valve 66 to admit steam into re-heater 16 to add the additional heat needed so that the temperature of the air will correspond to that called for by themostat 67. On the intermediate cycle, since there will be no condenser water at the inlet of valve 60 to supply heat, opening valve 60 will have no effect and the thermostat 67 will then automatically open valve 66 to supply the heat needed for the incoming primary air. Thermostat 68 is located outside the conditioned space and serves to reset thermostat 67 to provide hotter or colder air as the outside temperature drops or rises respectively. The entire device is so calibrated that the temperature of the air entering the room units will be such that the primary air will provide for sensible heat transmission gains or losses as aforementioned. Since such an arrangement is well known and forms no part of the invention per se, the above description is believed adequate.

A thermostat 69 is provided in the air stream off the preheater 14 to control valve 65 to maintain the air temperature at about 40° F. as pointed out above. This is necessary to insure that no freeze-up will occur in the dehumidifying coil 15. It will be thus apparent that the preheater will be inoperative until such time as the outside temperature drops below 40° F.

A master-submaster thermostatic arrangement 70—71 is provided for controlling the operation of distributing valve 44.

Turning now to Fig. 2, in conjunction with Fig. 1, the cold and hot water flow for the summer and intermediate cycles will be traced. Valve 30 will be set as shown and the chilled water will flow from water chiller 26 via line 27 through valve 30 and line 28 to the dehumidifying coil 15. Valve 35 will be set to allow flow between lines 31 and 32 and the chilled water will then flow from the dehumidifying coil 15 via lines 31, 32 and 33 to the various room coils 22. Should any or all of the valves 36 allowing flow through the various room coils be closed under the influence of thermostats 37, then the pressure relief valve 47 will open bypassing the chilled water around the units 11 and back to the inlet of pump 42. This will insure full flow of chilled water through the dehumidifying coil at all times, to properly condition the primary air.

Assuming, however, that some cooling is needed, then the various valves 36 will be open under the influence of thermostats 37 and the chilled water will flow from line 31 into line 32 and thence into line 33 under influence of pump 38 and then into the room coils 22. The chilled water leaves the room coils through the lines 40 which merge into line 41 for return to the water chiller 26.

Even though the chilled water will leave the water chiller 26 at a fixed temperature, this water temperature will vary out of dehumidifying coil 15 dependent on the temperature of the air passing over the coil. In order to maintain a desired temperature of water available at the room coils, distributing valve 44 will allow some of the water leaving the unit coils 22, which has been slightly warmed, to flow through line 45 and into line 33 wherein it mixes with the chilled water therein should the temperature of the chilled water be lower than desirable. Distributing valve 44 is controlled by a submaster thermostat 70 which in turn is set by master thermostat 71, the two being similar in operation to the arrangement which controls the primary air temperature. Preferably the master thermostat is of the type known as a "Solar Compensator," as manufactured by the Minneapolis-Honeywell Regulator Company, which is placed outside the building in a position where it responds to the solar effect is addition to the outside air temperature. The temperature of the chilled water enroute to the room coils 22 is thereby regulated to accurately reflect the need for cooling.

The heated condenser water in the meantime flows via lines 50 and 51 into cooling tower 52. Valve 59 will, of course, be set to provide connection between the two lines. The water will give up its heat in the cooling tower and then flow via lines 53 and 54 back to condenser 49.

During the summer cycle, primary or outside air entering the unit conditioner 10 will be filtered, cooled and dehumidified by the chilled water in coil 15 and delivered by fan 17 to the various units. The temperature of the air will be controlled to compensate for any sensible heat transmission gains. As soon as additional internal sensible heat gains in the form of people, lights, solar effect, etc. is introduced into any space, then the appropriate thermostat 37 will open the corresponding valve 36 to provide the additional cooling needed.

In the intermediate cycle, primary air is dehumidified and supplied to the units at a temperature elevated sufficiently above the design temperature by re-heater 16 to provide for sensible heat transmission losses. As before, coil 22 takes care of any internal sensible heat gains.

In the winter cycle, referring now to Fig. 3 in conjunction with Fig. 1, chilled water from the cooler 26 is bypassed around the dehumidifying coil 15. With valve 30 set as shown, chilled water flows via line 27, valve 30 and line 29, around coil 15, and into line 32. The flow thenceforth parallels that of the chilled water on summer cycle, i.e. through the various heat-exchange coils 22 and thence back to the cooler 26. Obviously, distributing valve 44 will again maintain the desired chilled water temperature.

With operation on the winter cycle, valve 59 is set to provide communication between lines 50 and 57, cutting the cooling tower out of the circuit. The condenser water then flows via line 50, valve 59 and lines 57 and 58 into the dehumidifying coil 15 where it serves to give up its heat to the incoming primary air stream. Any heat needed over and above that supplied by the heated condenser water is taken care of by re-heater 16 under the control of the master-submaster thermostatic arrangement 67—68. With valve 35 set as shown, the hot water exits coil 15 by way of line 31 and then flows via valve 35 and line 61 back to the inlet of pump 55 and thence into the condenser 49.

Primary air flowing through the unit conditioner 10 is then heated by the hot condenser water flowing through coil 15. Valve 60 will allow partial flow of hot water through the coil. As more heat is called for to satisfy thermostat 67 valve 60 will gradually allow full flow of the heated water through coil 15. Should thermostat 67 still not be satisfied then the re-heater 16 will take care of additional requirements.

The heated primary air will then flow under the influence of fan 17 to the various room units 22 and thence into the spaces to be conditioned, just balancing the sensible heat transmission loss.

When an internal sensible heat gain is imposed by way of people, lights, solar effects, etc. in any spaces, then a valve 36 under the influence of a thermostat 37 will allow flow of chilled water through coils 22 to provide for this load.

It will be appreciated that one zone is completely independent of any other with the only common apparatus being the central refrigerating system which supplies heated and chilled water to all zones. Also, all zones are considered in determining the "changeover" point. However, the number of zones varies from building to building with each zone's operation being unaffected by another zone's operation.

It is plainly apparent that I have provided an induction system retaining all of the flexible characteristics of prior systems and yet allowing simple air conditioning controls (cooling thermostat) to be used since only chilled water flows through the unit heat-exchange coils 22.

Further, as an inspection of Fig. 4 will reveal, the increasing trend toward building of larger glass areas has a beneficial effect on my "changeover" point while having a greatly detrimental effect on those of conventional systems. As was pointed out above, this is important from the standpoint of the difficulties of operating a cooling tower in below freezing weather with all of the consequent difficulties of icing.

An inspection of Fig. 4 reveals that as a building increases in the amount of glass area, the effect on the "changeover" point on my system is to slightly raise such a point. On a conventional system, a drastic lowering of the "changeover" point occurs.

It will be appreciated that even though the graphs were plotted for a building of a particular construction, they were plotted under the stated conditions, which prevail generally throughout the United States.

The curves are, therefore, characteristic and while they may shift slightly upward or downward on the ordinate, they will retain their characteristic slope.

The explanation lies in the fact that in a conventional system with increasing glass area the solar effect or internal sensible heat gain at "changeover" temperature is increased more rapidly than sensible heat transmission loss through the glass area, thereby causing a greater net internal sensible heat gain or cooling load. As pointed out previously, since the incoming primary air in a conventional system delivers an approximately constant amount of sensible B.t.u.'s of cooling, increasing the net sensible heat gain or cooling load by way of solar effect necessitates a lower "changeover" point so that the sensible heat transmission loss through the glass areas will be increased to compensate for the increased solar effect.

Contra distinguished therefrom, in my system, the solar effect is considered on but one glass exposure since these calculations are made on an instantaneous basis and the sun shines on but one exposure at any one instant. All four exposures are considered in computing the sensible heat transmission loss through the glass area, since obviously at any one instant there will be a sensible heat transmission loss through all exposures. Increasing the glass area will therefore, allow "changeover" at a higher outside temperature since the building will be able to absorb the sensible cooling load, as reflected in the condenser water, at a higher outside temperature considering the greater sensible heat transmission loss, which must be made up.

An inspection of Fig. 4 also reveals that in my system, as one moves from a system using 75 c.f.m. of primary air to a system using 50 or 25 c.f.m., there will be some drop in the "changeover" point with the lowest "changeover" point, however, still remaining above 32° F.

Contra distinguished thereto, in a conventional system lowering the c.f.m. of primary air has an extreme effect on the "changeover" point, especially in the common range of 25–75% glass area. It will also be seen that "changeover" points below 32° F. will be necessitated in many instances.

The explanation for this is that in a conventional system the primary air is utilized to provide necessary net sensible cooling load during winter operation. Reducing the amount of primary air, therefore, reduces the cooling effect that can be delivered and necessitates considerably lower "changeover" points so that the sensible heat transmission losses may be greater to thereby lower the net internal sensible heat gain or cooling load to a point where it corresponds to the lower amount of cooling delivered by the primary air.

In my system the only effect in reducing the amount of primary air is that somewhat less heat will be required to heat this primary air up from its entrance temperature to the design temperature. Since the heat available remains substantially constant a somewhat lower "changeover" point is necessitated to increase the heat losses to thereby compensate for the heat no longer required for heating the lesser amount of primary air.

In intermediate and winter cycles then, I provide a system that retains the desirable characteristics of prior art induction systems; the flexibility in being able to either heat or cool. I completely do away with the necessity for complex and costly summer-winter controls on the induction units. Further, the trend toward buildings having greater expanse of glass areas has a beneficial effect on the "changeover" point allowing operation of the cooling tower in above freezing weather and permitting earlier "changeover" with the consequent economy of utilizing the heat picked up in the refrigeration system to heat the incoming primary air. It is also apparent that increasing unit efficiencies have considerably less effect on the "changeover" point in my system.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. An air conditioning system for multi-room buildings comprising a plurality of conditioning units located in air communication with respective rooms, said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; refrigerating means for supplying a chilled fluid year-round to said coils and including a fluid cooled refrigerant condenser; a conditioner for treating said primary air and including a heat-exchange coil; heat dissipating means for said condenser fluid; and means for by-passing said heat dissipating means and for passing said condenser fluid through said conditioner heat-exchange coil.

2. An air conditioning system for multi-room buildings, operable on a summer, intermediate and winter cycle, comprising a plurality of conditioning units located in air communication with respective rooms, said units each including a heat-exchange coil and nozzle means; means for supplying primary air to said nozzle means for discharge through said units into said room, said primary air discharging at a sufficient velocity to induce a flow of room air through said units and over said heat-exchange coils in heat-exchange relation therewith; refrigerating means for supplying a chilled fluid to said coils and including a refrigerant condenser; conditioning means for treating said primary air on the summer cycle to counteract heat transmission gains and for treating said primary air on said intermediate and winter cycles to counteract heat transmission losses; heat dissipating means for said condenser operative on the summer and intermediate cycles; and means for rejecting condenser heat into the primary air operative on the winter cycle.

3. An air conditioning system for multi-room buildings comprising a plurality of conditioning units located in air communication with respective rooms, each of said units includng a heat-exchange coil and an air nozzle for causing room air to circulate through the unit in heat-exchange relationship with said coil; a source of outside air connected to said nozzles and including a heat-exchange coil; refrigerating means for supplying chilled fluid and including a refrigerant condenser which supplies a heated fluid; means for connecting said chilled fluid supply means in a closed circuit with said first-named coils; and means for alternately supplying said chilled fluid to said last-named coil for cooling and dehumidifying said outside air during summer operation or for supplying said heated fluid to said last-named coil for heating said outside air during winter operation.

4. An air conditioning system for multi-room buildings comprising a plurality of heat-exchange coils in air communication with respective rooms; means for delivering primary air to said rooms; means for flowing room air over said coils in heat-exchange relation therewith; refrigerating means for supplying a chilled fluid year-round to said coils and including a liquid cooled refrigerant condenser; a conditioner for treating said primary air and including a heat-exchange coil; heat dissipating means for said condenser liquid; and means for by-passing said heat dissipating means and for passing said condenser liquid through said conditioner heat-exchange coil.

5. An air conditioning system for multi-room buildings comprising a plurality of conditioning units located in air communication with respective rooms; said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; refrigerating means for supplying a chilled or heated fluid; a conditioner for treating said primary air and including a heat-exchange coil; means for passing said chilled fluid year-round through said unit heat-exchange coils; and means for passing said heated fluid through said conditioner heat-exchange coil.

6. An air conditioning system for multi-room buildings comprising a plurality of conditioning units located in air communication with respective rooms, said units each including a heat-exchange coil and nozzle means; means for supplying primary air to said nozzle means for discharge through said units into said rooms, said air discharging at a sufficient velocity to thereby induce a flow of room air through said units and over said heat-exchange coils in heat-exchange relation therewith; refrigerating means for supplying a chilled fluid to said coils and including a fluid cooled refrigerant condenser; a conditioner for treating said primary air and including a heat-exchange coil; means for supplying said chilled fluid year-round to said conditioner heat-exchange coil or bypassing it therearound; and means for supplying said condenser fluid to said conditioner heat-exchange coil when said chilled fluid is bypassed therearound.

References Cited in the file of this patent

UNITED STATES PATENTS

| | | |
|---|---|---|
| 2,219,815 | Jones | Oct. 29, 1940 |
| 2,363,294 | Carrier | Nov. 21, 1944 |
| 2,567,758 | Ashley | Sept. 11, 1951 |
| 2,797,068 | McFarlan | June 25, 1957 |